(12) United States Patent
Bucklew et al.

(10) Patent No.: US 11,451,308 B1
(45) Date of Patent: Sep. 20, 2022

(54) QUANTUM COMMUNICATIONS SYSTEM HAVING PULSES DIVIDED INTO TIME BINS AND ASSOCIATED METHODS

(71) Applicant: EAGLE TECHNOLOGY, LLC, Melbourne, FL (US)

(72) Inventors: Victor G. Bucklew, Richmond, VA (US); Samuel H. Knarr, Melbourne, FL (US); Samuel Nunez, Palm Bay, FL (US); Cypryan T. Klish, Melbourne, FL (US); James Drakes, Occoquan, VA (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 0 days.

(21) Appl. No.: 17/453,657

(22) Filed: Nov. 5, 2021

(51) Int. Cl.
    *H04B 10/70* (2013.01)
    *H04L 9/08* (2006.01)
    *H04B 10/60* (2013.01)
    *H04B 10/524* (2013.01)

(52) U.S. Cl.
    CPC .......... *H04B 10/70* (2013.01); *H04B 10/524* (2013.01); *H04B 10/60* (2013.01); *H04L 9/0852* (2013.01)

(58) Field of Classification Search
    None
    See application file for complete search history.

(56) References Cited

U.S. PATENT DOCUMENTS

| 8,456,736 | B2 * | 6/2013 | Wise | H01S 3/0057 |
| | | | | 359/341.1 |
| 8,477,947 | B2 * | 7/2013 | Cho | H04B 10/70 |
| | | | | 380/263 |
| 9,030,731 | B2 * | 5/2015 | Arahira | G02F 1/39 |
| | | | | 356/450 |
| 9,735,890 | B2 * | 8/2017 | Agarwal | H04B 10/70 |
| 9,823,194 | B2 * | 11/2017 | Goix | G01N 21/6428 |
| 10,109,976 | B2 | 10/2018 | Wise et al. | |
| 10,291,399 | B2 | 5/2019 | Nordholt et al. | |
| 10,367,638 | B2 * | 7/2019 | Bitauld | H04B 10/70 |
| 10,374,376 | B2 | 8/2019 | Liu et al. | |
| 10,541,809 | B2 * | 1/2020 | Godfrey | H04L 9/0855 |
| 10,862,677 | B2 * | 12/2020 | Bitauld | H04L 9/0852 |

(Continued)

FOREIGN PATENT DOCUMENTS

WO   2015/048783   4/2015

OTHER PUBLICATIONS

Zhang et al., Divided pulse soliton self-frequency shift: a multi-color, dual-polarization, power-scalable, broadly tunable optical source, Optica Publishing Group, 2017 (Year: 2017).*

(Continued)

*Primary Examiner* — Jai M Lee
(74) *Attorney, Agent, or Firm* — Allen, Dyer, Doppelt + Gilchrist, P.A.

(57) ABSTRACT

A quantum communications system may include a transmitter node, a receiver node, and a quantum communications channel coupling the transmitter node and receiver node. The transmitter node may include a pulse transmitter and a pulse divider downstream therefrom. The pulse divider may be configured to divide each pulse having a plurality of X photons into a plurality of Y time bins with Y>X. The receiver node may include a pulse recombiner and a pulse receiver downstream from the pulse recombiner.

21 Claims, 10 Drawing Sheets

(56) References Cited

U.S. PATENT DOCUMENTS

| | | | |
|---|---|---|---|
| 10,891,555 | B2 | 1/2021 | Ashrafi |
| 10,972,187 | B1* | 4/2021 | Tang .................... H04B 10/541 |
| 2014/0098955 | A1 | 4/2014 | Hughes et al. |
| 2016/0218867 | A1 | 7/2016 | Nordholt et al. |
| 2016/0380765 | A1 | 12/2016 | Hughes et al. |
| 2019/0190707 | A1* | 6/2019 | Tomita .................... G02F 1/035 |
| 2020/0050959 | A1 | 2/2020 | Ashrafi |
| 2021/0099236 | A1 | 4/2021 | Bucklew et al. |
| 2021/0142205 | A1 | 5/2021 | Ashrafi |
| 2022/0019409 | A1* | 1/2022 | Bharadwaj .............. G06F 1/105 |

OTHER PUBLICATIONS

Bucklew et al., U.S. Appl. No. 17/179,562, filed Feb. 19, 2021.

Bucklew et al., U.S. Appl. No. 17/179,600, filed Feb. 19, 2021.

Knarr et al., U.S. Appl. No. 17/453,658, filed Nov. 5, 2021.

Diamanti et al., "Practical Challenges in Quantum Key Distribution," NPJ Quantum Information (2016) 2; 16025; Published in Partnership with The University of New South Wales; pp. 1-12.

Drake et al., "Optical Key Distribution System Using Atmospheric Turbulence as the Randomness Generating Function: Classical Optical Protocol for Information Assurance," Optical Engineering; vol. 52(5); 0550008; May 2013; pp. 1-11.

El-Nayal et al., "Adaptive Free Space Optic System Based on Visibility Detector to Overcome Atmospheric Attenuation," Results in Physics; vol. 14; May 2019; 102392; pp. 1-7.

Korzh et al., "Provably Secure and Practical Quantum Key Distribution over 307 km of Optical Fibre," Nature Photonics 9; 163-168 (2015), DOI: 10.1038/nphoton.2014.327; arXiv:1407.7427; 14 pages.

Lai et al., "Key Generation From Wireless Channels," Physical Layer Security in Wireless Communications; Nov. 2013; DOI: htttps://doi.org/10.1201/b15496; 37 pages.

Lamb et al., "Divided-Pulse Lasers," Optics Letters; vol. 39; No. 9; May 2014; pp. 2775-2777.

Wilson et al., "Channel Identification: Secret Sharing Using Reciprocity in Ultrawideband Channels," IEEE Transactions on Information Forensics and Security; vol. 2; No. 3; Sep. 2007; pp. 364-375.

Zhang et al., "Divided Pulse Soliton Self-Frequency Shift: A Multi-Color, Dual-Polarization, Power-Scalable, Broadly Tunable Optical Source," Optics Letters; vol. 42; No. 3; Feb. 2017; pp. 502-505.

Zhou et al., "Divided-Pulse Amplification of Ultrashort Pulses," Optics Letters; vol. 32; No. 7; Apr. 2007; pp. 871-873.

* cited by examiner

US 11,451,308 B1

QUANTUM COMMUNICATIONS SYSTEM HAVING PULSES DIVIDED INTO TIME BINS AND ASSOCIATED METHODS

FIELD OF THE INVENTION

The present invention relates to the field of communications, and, more particularly, to quantum communication systems and related methods.

BACKGROUND OF THE INVENTION

In a quantum communications system, sometimes referred to as a quantum information system, information is exchanged between a transmitter node and a receiver node using encoded single photons. Each photon carries information that is encoded on a property of the photons, such as its polarization, phase, or energy in time. These quantum communications systems generally require sending information from one node to another node, such as a transmitter node, usually referred to as "Alice," and a receiver node, usually referred to as "Bob." The term quantum communications system encompasses multiple applications. For example a quantum key distribution (QKD) system allows the sharing of cryptographic keys between the transmitter node and receiver node, thus allowing a more secure communication between the two parties. A QKD system provides a test whether any part of the key would be known to an unauthorized third party eavesdropper, usually referred to as "Eve."

Individual bits of the bit stream are transmitted using single photons. By using complementary properties to which Heisenberg's uncertainty principle applies, information may be encoded into a photon to prevent the unauthorized third party, e.g., "Eve," from monitoring the photon since it would disturb its state. When a secret key is established between the two parties by this QKD system, the two parties may then encrypt data transmitted over any conventional communications channel.

In the QKD system, the two parties as Alice and Bob at the respective transmitter node and receiver node may use two or more non-orthogonal bases to encode bit values. The laws of quantum mechanics apply to the photons and any measurement of the photons by an eavesdropper, e.g., Eve, without prior knowledge of the encoding basis of each photon, causes an unavoidable change to the state of some of the photons. These changes to the states of the photons may cause errors in the bit values sent between the transmitter node and receiver node, and by comparing a part of the common bit steam, the two parties may determine if the eavesdropper, e.g., Eve, has gained information. Photon polarization is often used to provide the complementary properties for encoding, and is used in the common QKD protocol, BB84, and may be applied to conjugate states, such as the polarization state of the quantum state. Other QKD protocols, such as E91, may be based on entanglement of photon pairs and used in a QKD system.

Other applications of a quantum communications system include quantum random number generator (QRNG) systems that use the inherent indeterminacy of quantum entangled photons to produce random binary digits, and quantum secure direct communication (QSDC) systems that transfer direct information between Alice and Bob without a distribution key. In QSDC systems, the transmitter node as Alice generates quantum photons that carry secure quantum information representative of the data to be communicated. The quantum photons carrying the data are decoded upon receipt at the receiver node as Bob.

QSDC systems are based on quantum mechanics for direct transmission of information without employing a distributed cryptographic key to encrypt the data. QSDC systems may be more efficient than some keyed communication systems because the cryptographic key development and key storage requirements are eliminated. Transmitted photons carrying data within the QSDC system may be more readily maintained in confidence without being erased, manipulated or monitored by unintended third parties, such as Eve. These QSDC systems may provide tamper evident communication links that are compatible with the direct transmission of data at the single photon level. As a result, QSDC systems may become more important as quantum computers increase in sophistication and allow conventional cryptographic keys to be more easily broken, while quantum interconnects are developed that network computers together. Improvements in QSDC systems may also provide quantum signatures and improve the efficiency and impart greater security in a quantum communications channel.

Existing telecommunications security approaches based on computational key management have security shortcomings that are threatened by "download today, decrypt tomorrow" quantum attacks. Quantum communications systems may be more secure than conventional communications systems, but come at a cost of orders of magnitude slower data rates, resulting in a disconnect between security and speed. Physical layer security protocols have been proposed as potential approaches for quantum cryptography errors, but are limited by the speed of opto-mechanical components or interfering channel phenomena, making insertion into existing optical communication systems challenging. Analog attacks for physical layer security protocols, even those against computational attacks, represent an additional threat that should be considered for new communication protocols.

Many QKD protocols exists, but none are considered to stand above the others. State-of-the-art communications systems use many different QKD protocols. A round-robin DPS (Differential Phase-Shift) quantum key protocol has a high QBER (quantum bit error rate) tolerance of about 50%, but the best key rate is about 10 Kbit/s over 50 kilometers of fiber. Continuous variable protocols face similar limitations, and the performance, e.g., key rate or operability, degrades with channel conditions such as existing in free-space optical communications. RSA (Rivest-Shamir-Adleman) encryption on classical optical carriers can theoretically be used to counter "download today and decrypt tomorrow," but the possibility of quantum computers in the near future makes long term personal information, such as bank information and social security numbers, vulnerable to attacks.

On the other hand, current physical layer security approaches may provide an analog layer of protection to communication systems and offer advantages that address quantum cryptography errors. However, these systems often rely on reconfigurability of transceivers or their communications channels to achieve security. For example, the speeds of opto-mechanical components or varying channel conditions may impact performance. While these communication systems are secure, they may operate on orders of magnitude slower than required to facilitate insertion into state-of-the-art optical communication systems.

SUMMARY OF THE INVENTION

In general, a quantum communications system may include a transmitter node, a receiver node, and a quantum communications channel coupling the transmitter node and receiver node. The transmitter node may comprise a pulse transmitter and a pulse divider downstream therefrom. The pulse divider may be configured to divide each pulse having a plurality of X photons into a plurality of Y time bins with Y>X. The receiver node may comprise a pulse recombiner and a pulse receiver downstream from the pulse recombiner.

The pulse receiver may comprise a detector configured to detect a number of photons greater than 100 photons. Additionally, the pulse receiver may comprise a detector configured to detect a number of photons less than 10,000 photons. The pulse divider may comprise a plurality of staged birefringent crystals.

The pulse recombiner may comprise a plurality of staged birefringent crystals. The pulse transmitter may be configured to generate temporally modulated photons. The quantum communications channel may comprise at least one of a fiber optic communications channel, a free space optic communications channel, and an underwater optic communications channel. The pulse transmitter may be configured to generate orthogonally modulated photons. Additionally, the pulse transmitter may be configured to generate a bit stream of quantum pulses in a quantum key distribution (QKD) protocol.

A method aspect is for operating a quantum communications system using a transmitter node, a receiver node, and a quantum communications channel coupling the transmitter node and receiver node. The method may include operating the transmitter node to generate quantum pulses at a pulse transmitter and dividing the quantum pulses at a pulse divider to divide each pulse having a plurality of X photons into a plurality of Y time bins with Y>X. The method may also include operating the receiver node to recombine the divided quantum pulses at a pulse recombiner, and receiving the recombined pulses at a pulse receiver.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
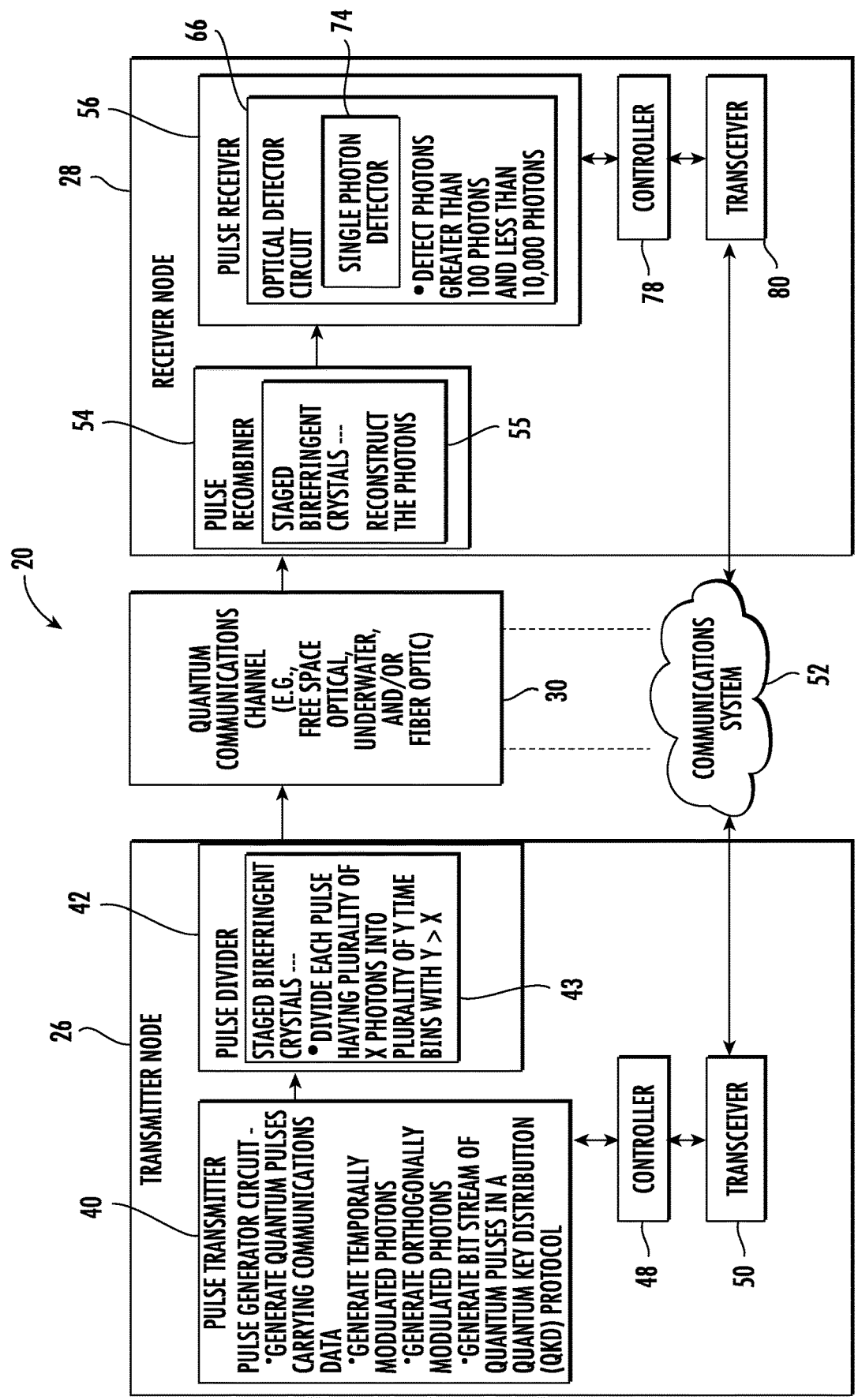
FIG. 1 is a block diagram of the quantum communications system having the pulse divider that divides each pulse into time bins in accordance with a non-limiting example.

Referring initially to FIG. 1, a quantum communications system is illustrated generally at 20 and may be operative as a quantum secure direct communications (QSDC) system, which permits direct communication, such as without use of a cryptographic key. The quantum communications system 20 may also operate as a quantum key distribution (QKD) communications system that shares cryptographic keys between the transmitter node 26 and receiver node 28 that may communicate with each other via a quantum communications channel 30 or via a conventional communications system 52 to exchange keys. The quantum communications channel 30 may be a free-space optical, underwater, and/or fiber optic communications channel.

This quantum communications system 20 includes its transmitter node 26 referred to as Alice, its receiver node 28 referred to as Bob, and the quantum communications channel 30 coupling the transmitter node and receiver node. The quantum communications system 20 may incorporate pulse division to place a quantum state into a super position of time bins. Neighboring quantum states thus experience interference with each other, which scrambles the original communications data stream. Coupled with the no-cloning theorem of quantum mechanics, this acts as a physical layer of security that can be used to securely transmit quantum data streams within the quantum communications channel 30 without the additional use of a cryptographic key in some embodiments.

As illustrated, the transmitter node 26 includes a pulse transmitter 40 and a pulse divider 42 downstream therefrom. The pulse divider 42 is configured to divide each pulse having a plurality of X photons into a plurality of Y time bins with Y is greater than X. The receiver node 28 includes a pulse recombiner 54 and a pulse receiver downstream 56 from the pulse recombiner. In an example, the pulse transmitter 40 may include a laser or similar pulse generator that generates a laser and may include quantum pulses carrying communications data that may be encrypted and the pulses may be of varying length from continuous wave (CW) to very short pulses, and may be divided into bins. This pulse transmitter 40 may also generate temporally modulated photons, orthogonally modulated photons, and in an example, other spatially modulated photons. The pulse transmitter 40 may also generate a bit stream of quantum pulses in a quantum key distribution (QKD) protocol. The pulse divider 42 may include a plurality of elements such as staged birefringent crystals 43 that divide each pulse having a plurality of X photons into the plurality of Y time bins where Y is greater than X. The pulse recombiner 54 also may have staged birefringent crystals 55 that reconstruct the photons received over the quantum communications channel 30. The pulse division and recombining stages may be based on using free space optics, such as a combination of polarizing beam splitting cubes, ½ and ¼ waveplates, mirrors, and free space delay lines. Fiber components may be used such as polarization beam splitters and combiners in fiber based on separating and combining different spatial modes of polarizing beam fiber, with fiber delay lines, and manual or electronic fiber polarization controllers based on fiber birefringence, or fiber-free space polarization control-fiber where free space polarization control could include electronic or manual waveplates, or a lithium niobate modulator, for example.

The transmitter node also includes a controller 48 that operates the pulse transmitter 40 and a transceiver 50 that connects to a communications system 52 as will be explained in further detail below and which may be part of the quantum communications channel 30. The pulse receiver 56 may include an optical detector circuit 66 that incorporates opto-electric (OE) circuitry such as a spatial filter and beam splitter that splits signals into a phase basis or time basis using a phase detector or photon detector. A single photon detector 74 may detect single photons or the optical detector circuit 66 may detect a plurality of photons at one time. The receiver node 28 also includes a controller 78 and transceiver 80 connected to the pulse receiver 56. The transceiver 80 is coupled to the communications system 52 and communicates with the transceiver 50 located at the transmitter node 26.

The pulse transmitter 40 and pulse divider 42 may be formed as conventional off-the-shelf optical components and the bit stream may be modulated onto a laser transmitter or other optical pulse generator device that generates and transmits pulses as part of the pulse transmitter 40. In an example, the output power of generated pulses may be attenuated to a few hundred photon regime, such as above 100 photons and fewer than 10,000 photons, such that high-speed optical detectors at the pulse receiver 28 as part of the optical detector circuit 66 can detect even while using more conventional off-the-shelf (COTS) optical detector components. At the transmitter node 26, each of the X photon data bit pulses is divided into Y time bins with the pulse divider 42. For the case of Y greater than X, a few hundred to about ten thousand photon bits are placed into a super position state, which is propagated across the quantum communications channel 30. Any measurements made mid-length by "Eve" as an intruder cannot be used to decode the original bit stream, due to the wave function collapse of the individual photons of the original bit upon measurement. This provides a quantum resource for security at the few hundred to about ten thousand photon level that usually is constrained to a single photon in a bit of quantum resource security.

At the receiver node 28, photons are received and the receiver node operates as a matched or conjugate-receiver and the photons reconstructed at the pulse recombiner 54, which employs the staged birefringent crystals 55 to reconstruct the photons as a reverse of the deconstruction process that has occurred at the transmitter node 26. A tamper evident port at the output of the receiver node 28 may flag corrupted photons, indicating a compromise of the communications link. High speed, conventional off-the-shelf GHz class optical detectors at the optical detector circuit 66 may be used to measure the recombined bit stream, composed of a hundred to about ten thousand photons. This allows a quantum secured communications link to extend greater than 100 kilometers, while maintaining Gbps data rates using these conventional off-the-shelf optical transmitter and receiver components at the pulse transmitter 40, pulse divider 42, pulse recombiner 54, and pulse receiver 56.

Figure 2:
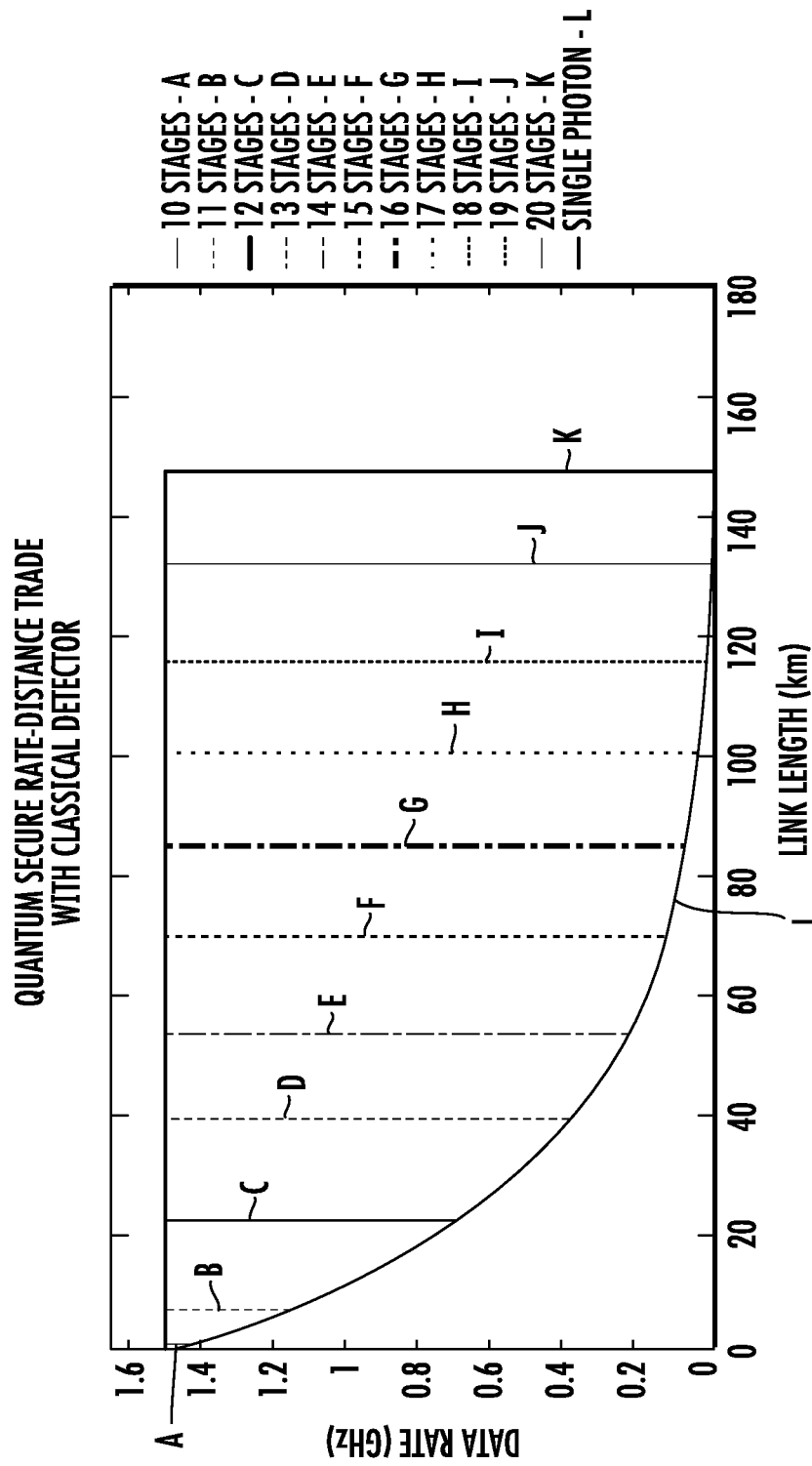
FIG. 2 is a graph showing the data rate in GHz versus the link length in kilometers for different stages using the quantum communications system of FIG. 1.

Referring now to FIG. 2, the graph shows the data rate in gigahertz (GHz) versus the link length in kilometers relative to the different number of stages, which are illustrated as the vertical lines, for an anticipated quantum secure rate-distance trade-off using the optical detector circuit 66 at the pulse receiver 56. The graph shows that as long as the received photon number is greater than the minimum detector signal-to-noise ratio (SNR), the data rates do not exponentially reduce with distance similar to the way that single photon quantum communications systems perform.

Figure 3:
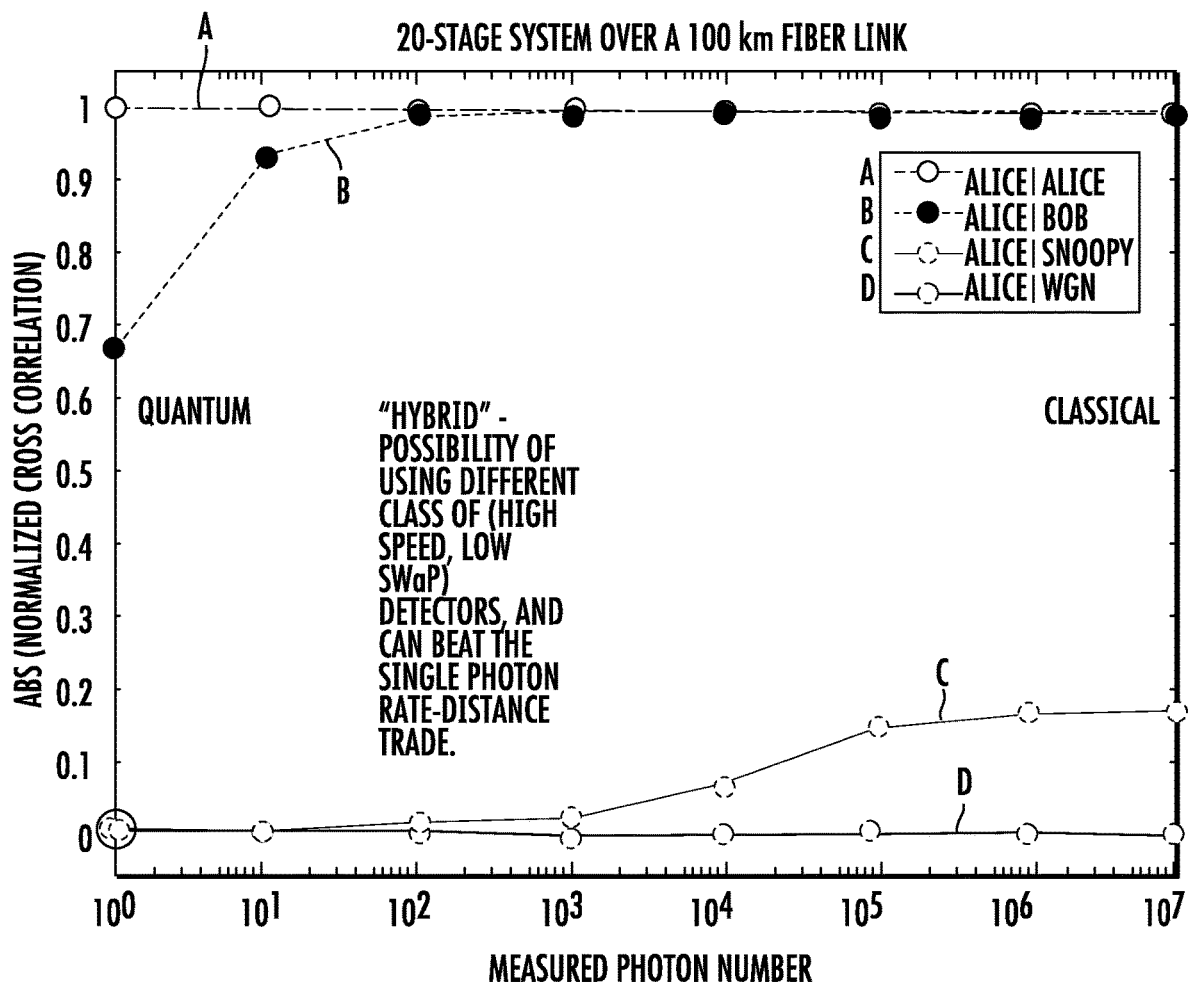
FIG. 3 is a graph of normalized cross-correlation versus measured photon number and the quantum communications system of FIG. 1 compared to other communication systems.

Referring now to FIG. 3, there is illustrated a graph of the normalized cross-correlation relative to the measured photon number and showing the results of the quantum communications system 20 of FIG. 1 referred to as the "hybrid" compared to other communications such as a quantum communications system using a single photon polarization (referred to as "quantum") and a "classical" or conventional optical communications system. The graph shows the degree of correlation of a transmitted image at different points such as Alice at the transmitter node 26, Snoopy or Eve as the intruder at the mid-link connection of the quantum communications channel 30 and interfering to determine the communications data, and Bob at the receiver node 28. The communications channel 30 connects the transmitter node 26 and receiver node 28 that includes a 20-stage circuit for a matched transmitter node to the receiver node as a function of the photon number.

The simulation is for communications data transmitted over a 100 kilometer fiber link. In terms of the correlation, the NCC (Normalized Cross-Correlation) of 1 indicates a perfect correlation, while the NCC of 0 shows no correlation. For a quantum communications system using a single photon instead of a plurality of photons as in the system 20 of FIG. 1, the NCC values for Snoopy or Eve at the midpoint of the quantum communications channel 30 are nearly 0. However, at the receiver node 28, the NCC values are lower. This is due to photon annihilation from the fiber absorption that impacts the quality of image reconstruction and shows the expected limits of single photon channels. A classical or conventional optical communications system has millions or more photons, and the conventional implementations have adequate security with this transceiver pair, but are more than 10 times higher than the hybrid (FIG. 1) in quantum cases. The hybrid case corresponding to the optical communications system of FIG. 1 has 100 to 10,000 photons and the measurement provides NCC values that are just barely above white Gaussian noise for Snoopy or Eve, but which also reflect a near perfect reconstruction for the intended recipient at the receiver node 28, corresponding to Bob.

Due to the longer communications channel 30, the few hundred or thousand photon system as shown by the block diagram of FIG. 1 out-performs both a single photon quantum communications system by beating the single photon rate-distance trade that degrades the image quality between Alice and Bob as the respective transmitter node 26 and receiver node 28, and the classically equivalent system of a conventional optical communications system by reducing the information shared between Alice and Snoopy (Eve) as the intruder by about 10 times in terms of maximizing information to the receiver node 28 as Bob, while minimizing information to the intruder such as Snoopy or Eve at the mid-point. The hybrid case as shown in the graph of FIG. 3 and corresponding to the quantum communication system 20 of FIG. 1 shows the possibility of using a different class of high-speed, low SWaP detectors and can beat the single photon rate-distance trade.

Figure 4:
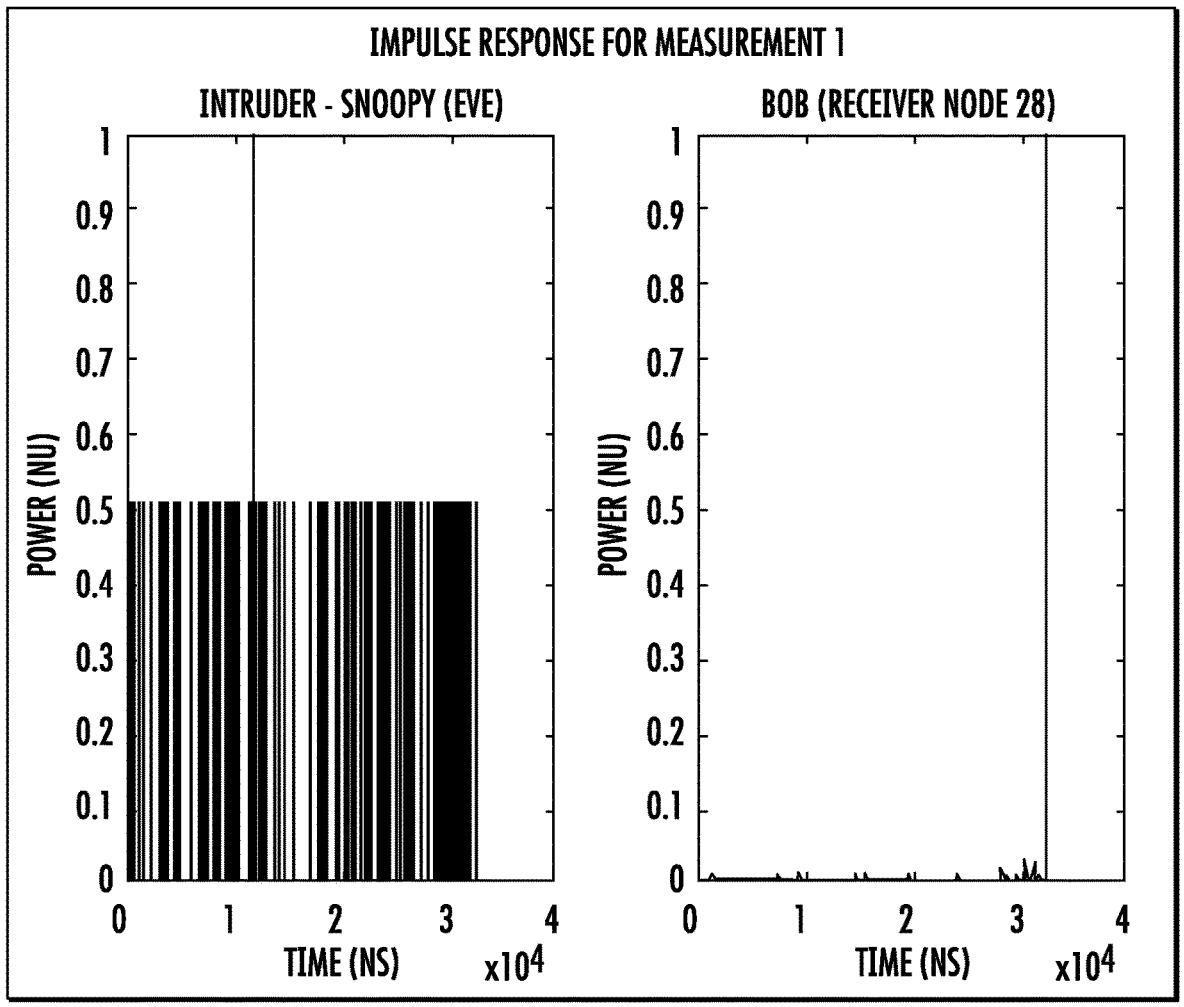
FIG. 4 is a bar chart showing the impulse response along the quantum communications channel for an intruder (Snoopy) versus the receiver node (Bob).

Referring now to FIG. 4, a bar chart of the impulse response with power (NU) versus time in nanoseconds (ns) shows that the quantum communications system 20 behaves as expected. The left-hand bar chart for Snoopy as the intruder (Eve) is compared to the performance from Bob as the receiver node 28 on the right. The impulse response changes for each measurement for Snoopy or Eve due to the collapse of the super position state of the impulse when X photons are placed into Y bins where Y is greater than X. This can be leveraged to provide a layer of security. The impulse response remains constant at the receiver node 28 for Bob, allowing Bob to directly measure what the transmitter node 26 of Alice transmits.

The three communications systems shown in the graph of FIG. 3 include advantages and disadvantages. A quantum communications system using a single photon requires a slow quantum detector. The system impulse response will change for repeated measurements, for example, with a quantum super position collapse and the pulse division scrambles the bits to provide high security, but the link loss degrades image reconstruction. A classical or conventional optical communications system without any quantum basis will have tens of thousands to millions of photons per bit and may use a high-speed classical or conventional off-the-shelf detector, but has no quantum layer of security. The system impulse response is constant for repeated measurements and the pulse division scrambles the bits and the image may be reconstructed despite link loss.

The quantum communications system 20 as described relative to FIG. 1 as a quantum-classical hybrid system has as few as a hundred photons to about 10,000 photons per bit and may use a high-speed conventional off-the-shelf optical detector circuit 66. The system 20 includes a quantum layer of security where the system impulse response changes for repeated measurements and a quantum super position collapse. The pulse division at the pulse divider 42 scrambles the bits as a classical layer of security and the image may be reconstructed despite link loss.

Referring now again to FIG. 1, in an example, the pulse divider 42 and pulse recombiner 54 may operate to provide a divided pulse quantum key distribution that may be applied on top of existing QKD protocols and implemented downstream of the pulse transmitter 40 and upstream of the pulse receiver 56 to improve the performance of existing QKD protocols. It is possible that the transmitter node 26 may also be configured to generate spatially modulated photons that are transmitted over a multi-mode optical fiber, as compared to temporally modulated photons that are communicated over a single mode optical fiber connection. Temporally or spatially modulated photons may use optical polarization encoding, and in the single photon transmission, each photon may have a transmitted quantum basis. The transmitter node 26 and receiver node 28 may communicate using the communications system 52, which may include a classical communications channel and be formed as a fiber optic, free-space, wired, or other conventional communications channel. This communication system 52 may be employed for cryptographic key generation, quantum key distribution (QKD), or communication with network devices using the conventional transceivers 50,80. The quantum communications system 20 may use cryptographic key sifting or operate as a QSDC system, and the quantum communications channel 30 may be integral with the communication system 52 shown by the dashed lines connecting the two, indicating that both quantum communications and non-quantum communications may be transmitted over any communications channel as part of the communication system.

Reference is made to U.S. patent application Ser. No. 17/179,562 entitled, "Quantum Communications System Using Pulse Divider and Associated Methods," and U.S. patent application Ser. No. 17/179,600 entitled, "Communications System Using Pulse Divider and Associated Methods," both applications which were filed on Feb. 19, 2021, the disclosures which are hereby incorporated by reference in their entirety. Those applications disclose use of either a single photon pulse transmitter or optical transmitter for generating a conventional bit as tens of thousands of photons for single photon encoding an optical transmitter for tens of thousands or more of photons per bit and the pulse divider for a quantum communications system or optical communications system. Components as described in those applications may be modified and incorporated into the quantum communications system 20 of FIG. 1.

In an example, the optical pulse output from the pulse transmitter 40 at the transmitter node 26 may be an output bit stream of photons that are encoded bit values. The photon polarization may provide a complementary property used for encoding purposes, such as in the QKD protocol, BB84. Other protocols, such as the E91 protocol, may be used that includes encryption or the entanglement of photon pairs. Each bit of information such as a "0" or "1" may be encoded onto an individual photon or group of photons as in the quantum communications system 20 of FIG. 1 by selecting from a pair of orthogonal polarization states. In the BB84 QKD protocol, two pairs of orthogonal states are used, and each pair of orthogonal states is referred to as a "basis." The basis may provide polarization state pairs in a rectilinear basis having vertical and horizontal polarization, such as 0° and 90°, and a diagonal basis having opposite diagonal direction polarization, such as 45° and 135°.

It is also possible to use a circular basis of left-handedness and right-side handedness depending on what other bases are used that are conjugate to each other. The quantum communications system 20 may use an unencrypted non-quantum communications channel, such as the communications system 52, for the key exchange or key sifting process. It is possible to use a continuous-variable QKD (CV-QKD) protocol or a discrete-variable (DV-QKD) protocol. Single photons may be generated for the DV-QKD protocol, usually as optical pulses, and usually uses single photon detectors 74 at the receiver node 28, for example, as an array of single photon optical detectors. In contrast to the DV-QKD protocol, the CV-QKD protocol may use conjugate-continuous degrees of freedom (field quadratures) of a light pulse prepared in a Gaussian (coherent or squeezed) state to transmit signals that constitute a shared randomness.

At the receiver node 28, in some examples, the field quadratures of each light pulse may be measured using as an example, shot-noise limited, balanced homodyne or heterodyne detectors, such as phase detectors, which have an advantage of not requiring single photon detection and operating at high GHz speed detection rates. In the CV-QKD protocol, often a local oscillator (OL) signal may be generated at the transmitter node 26 and the CV-QKD protocol may involve polarization encoding and multiplexing techniques.

As noted before, the transceiver 50 at the transmitter node and the transceiver 80 at the receiver node 28 may communicate with each other via the communications system 52, which may be a conventional, i.e., non-quantum communications system. For example, Bob as the receiver node 28 may communicate with Alice as the transmitter node 26 over the conventional communications system 52, and transmit data regarding the basis in photons that were received at the receiver node 28 when single photon polarization is used. The transmitter node 26, e.g., Alice, may transmit data about the basis in which each photon was transmitted to the receiver node 28, e.g., Bob, using the communications system 52. Any bits having a different basis may be discarded, leaving the remaining bits as the basis for a shared cryptographic key in the key verification or key shifting phase. The subset of shared bits used by both parties, e.g., Alice and Bob at their respective transmitter node 26 and receiver node 28, may be used to check against eavesdropping by the unauthorized party, e.g., Eve, which would have introduced errors into the communications stream of bits.

The transmitter node 26 and its pulse transmitter 40 may include other components not illustrated in detail, such as a spatial light modulator (SLM) that imposes a spatially varying modulation by modulating intensity and phase, a waveguide array and associated optical circuitry that generates phase bin states, and an attenuation filter that may be used with the large number of photons usually generated in a conventional off-the-shelf optical pulse transmitter to reduce the number of photons and operate as the "hybrid" quantum communications system 20 shown in FIG. 1.

As noted before, the transmitter node 26 includes the pulse transmitter 40 for generating a bit stream of quantum optical pulses. The pulse transmitter 40 may be a laser or other pulse generator circuits of optical pulses.

The optical pulses from the transmitter node 26 are an output bit stream of photons that have encoded bit values. The photons may be temporally or spatially modulated and transmit a quantum basis that includes time, and in some examples, phase parameters, including optical polarization encoding. A photon polarization may provide the complementary property used for encoding purposes. In the quantum communications system 20 of FIG. 1, optical pulses may be arranged in time bins and photon polarization may be applied to conjugate states, such as phase encoding. The quantum communications system 20 may use entanglement of photon pairs, and each bit of information such as a "0" or "1" may be encoded onto an individual photon by selecting from a pair of orthogonal polarization states. In the optical communications system of FIG. 1, the information may be encoded onto the group of photons.

In an example, two pairs of orthogonal states may be used, and each pair of orthogonal states may be referred to as a "basis." The bases may provide polarization state pairs in a rectilinear basis having vertical and horizontal polarization, such as 0° and 90°, and a diagonal basis having opposite diagonal direction polarization, such as 45° and 135°. It is also possible to use a circular basis of left-handedness and right-handedness depending on what other bases are used that are conjugate to each other.

The transmitter node 26 includes its controller 48 operatively connected to the pulse transmitter 40 and other components at the transmitter node 26 to control their operation. The controller 48 operates the pulse transmitter to transmit one or more photons, such as 100 to 10,000 photons, in a polarization state defined by the bit and basis and in time bins, and may record the time the bit and its photons were transmitted. This process may be repeated for the string of bits as a stream of photons. The transmitter node 26 may include its transceiver 50 connected to the controller 48 and operative to communicate with conventional networked components via the communications system 52.

Additional functions for Quantum Key Distribution (QKD) at the receiver node 28 may be provided via the communications system 52.

The transmitter node 26 may transmit the bit stream of pulses via the pulse divider 42 over the quantum communications channel 30, which may be integral or separate from the communications system 52. The photons may be temporally modulated or spatially modulated depending on end use and the construction of the pulse transmitter 40. It is possible to use the same communications channel 30 such as a fiber optic cable for both quantum communications and conventional communications.

The receiver node 28 includes the pulse recombiner 54 that recombines the pulses, and pulse receiver 56, which in an example includes opto-electronic (OE) circuitry having an optical detector circuit 66 that receives the bit stream of pulses from the transmitter node 26 over the quantum communications channel 30 and had been reconstructed via the pulse recombiner 54. The optical detector circuit 66 may include a spatial filter, which may be used depending on the example of transmitted pulses to split the optical signal into an optical phase or optical time stream, allowing measurement in the phase basis or time basis. A spatial filter may be used to "clean up" the bit stream of optical pulses and produce a smooth intensity profile as a cleaner Gaussian signal that has unwanted multiple-order energy peaks removed such that the central maximum of a diffraction energy pattern. A spatial filter may include a microscopic objective lens, a pinhole aperture and a positioning mechanism having precision X-Y movement at the center of the pinhole that operates as the focal point of the objective lens in a non-limiting example. A spatial filter may also be advantageous because it operates as a filter for any spatial probability distribution function that may not be characterized, cloned and reintroduced to the public portion of the quantum communications channel 30. Thus, any spatial probability distribution disturbances that are introduced may not cleanly exit the spatial filter, and thus, Bob at the receiver node 28 may use this information as a metric to reveal tampering.

The optical detector circuit 66 may receive the bit stream of optical pulses and detect the optical pulses and generate signals that may be processed at the controller 78, which may process and demodulate the signals representative of the optical pulses depending on the communications protocol. At the receiver node 28, the optical detector circuit 66 may be formed as a single photon detector 74 for measuring photons in the time basis and in respective time bins, where the optical pulses are transmitted in respective time bins for data encoding. In an example, the optical detector circuit 66 may include an array of single photon detectors 74. The optical detector circuit 66 may also include a phase detector circuit for measuring the photons in the phase basis.

The controller 78 at the receiver node 28 is connected to the conventional transceiver 80, which may communicate via the conventional or non-quantum communications system 52 with other networked components or to the transceiver 50 located at the transmitter node 26. The transmitter node 26 may include other components not illustrated in detail, such as a spatial light modulator (SLM) that imposes a spatially varying modulation by modulating intensity and phase, a waveguide array that increases bit generation and phase bin states, and an attenuation filter, which operate together with other optical components to transmit temporally modulated photons or spatially modulated photons and perform optical polarization encoding.

It is possible to include a phase detector and the single photon detector 74 for phase basis and time basis measurements. Generally, an eigenstate |Ψ> as a photon of a particular basis may be prepared and transmitted from the transmitter node 26 as Alice over the quantum communications channel 30 to the receiver node 28 as Bob. In a conventional QKD system, if the eigenstate |Ψ> was prepared in the same photon basis that Eve or Bob as the receiver node 28 chooses to measure the quantum state in, both will measure the same state that Alice at the transmitter node 26 initially prepared. If Eve or Bob at the transmitter node 28 choose a different basis than the one Alice at the receiver node 26 initially prepared the quantum state in, both would collapse the eigenstate |Ψ> into one of the eigenstates of the basis they were measuring in, and would have a 50% chance in a d=2 data structure, for example, corresponding to a random guess, of correctly identifying the associated bit value of the state that Alice sent. This practicality may be applied to the multiple photon quantum communications system 20 of FIG. 1.

This use of mutually unbiased bases, and the impact of preparing and measuring in inconsistent bases, may be used to establish a more secure communications link between Alice as the transmitter node 26 and Bob as the receiver node 28 over the quantum communications channel 30. As Eve is forced to annihilate the state Alice 26 had prepared in order to gain any information about it, and as Eve must randomly choose a basis to measure the state in, on average Eve will choose the wrong basis 50% of the time, both resulting in measurements which do not provide Eve information about the original state, and revealing Eve's presence to Bob as the receiver node 28 downstream through a quantum bit error rate (QBER) that is higher than a certain threshold value.

It is generally assumed that the eigenstate prepared in a particular basis, does not change as it propagates. Thus, If Eve, and Bob at the receiver node 28, choose the same basis to measure the state that Alice at the transmitter node 26 initially used to prepare the state in, Eve and Bob will both measure it accurately. For a 4-state transmission, however, Eve as an intruder has on average a 75% chance of correctly retrieving the bit value that Alice as the transmitter node 26 sends, as she has a 50% chance of correctly choosing the right basis and 100% accuracy of retrieving the associated bit value in the correct basis, and a 50% chance of choosing the wrong basis, and a 50% accuracy of retrieving the associated bit value when measuring in the wrong basis. The amount of error that Bob as the receiver node 28 can tolerate before knowing that the quantum communications channel 30 is insecure and that Eve is present, is in part dependent on this probability, which essentially reflects the amount of information that Eve has access to.

Increasing the maximum threshold of the quantum bit error rate (QBER) that Bob as the receiver node 28 can tolerate before concluding that the quantum communications channel 30 is insecure, may increase secure link lengths, increase secure bit rates, and enable more efficient and cost effective implementations of the quantum communications system 20 in existing communication links. It may also better enable secure communications for QKD systems. Additionally, the increased threshold may also secure the transmission of quantum information using the system 20 in general, for example, for distributed quantum computing or sensing applications.

The quantum communications system 20 increases the maximum QBER threshold where an initial state |Ψ> has its temporal probability distribution broadened, so that it interferes with other neighboring bits in the bit stream, and scrambles the state and bit stream in the public link of the quantum communications channel 30 that Eve has access to. Any measurements made at a location other than where Alice at the transmitter node 26 and Bob at the receiver node 28 are located will reduce the information available to Eve, even if Eve chooses to measure |Ψ> in the same basis that the state was initially prepared in. The quantum communications system 20 even with multiple pulses may reduce Eve's information about the eigenstate |Ψ> in the public segment of the quantum communications channel 30 even for measurements she conducts in the correct basis. The QBER threshold required for unconditional security may be increased even when Eve as an intruder chooses the right basis. The probability that Eve will measure the state Alice at the transmitter node 26 initially sent is reduced. As a result, using the quantum communications system 20 of FIG. 1 as a QSDC system, Alice as the transmitter node 26 and Bob as the receiver node 28 may tolerate higher system losses, increase communication link distances, relax optical detector circuit 66 requirements, and more easily adapt the quantum communications system 20 into existing telecom networks.

Time basis measurements may be performed with direct detection to resolve the arrival times of pulses associated with the various bit values that Alice 26 sends. It is also possible to incorporate into the system 20 the time to frequency conversion techniques disclosed in commonly assigned U.S. patent application Ser. No. 16/583,346 filed Sep. 26, 2019, entitled, "Quantum Communication System Having Time to Frequency Conversion and Associated Methods," the disclosure which is hereby incorporated by reference in its entirety.

It is possible that phase basis measurements may be performed by passing a single photon state through a Mach-Zender interferometer, which has a delay set by a time bin width of a protocol for the quantum communications system 20 or a half width of a waveguide. Single photon interference occurs in a central time window, which the two outputs of a Mach-Zender interferometer may resolve constructively or destructively depending on the eigenstate of the phase basis that was sent. For example, if phase state 1 was sent with an associated bit value 0, a phase detector may yield a detection event for P1 on Detector 1, and no detection event on P1 of Detector 2.

Different circuit examples of pulse dividers 42 and pulse recombiners 54 may be incorporated into the quantum communications system 20 of FIG. 1. The pulse divider 42 may receive an input pulse of a first energy level and divide the pulse into a sequence of temporally spaced lower-energy pulses. The pulse recombiner 54 may combine the temporally spaced pulses for input into the pulse receiver 56. The pulse divider 42 may be formed from a sequence of M birefringent elements, such as staged birefringent crystals 43, which divide an initial pulse into a sequence of $2^M$ pulses. This sequence of pulses may include a first group of pulses that have a first polarization, and a second group of pulses that have a second orthogonal polarization. It is possible that the pulses in the first and second groups are interleaved with one another, so that the sequence of pulses have alternating linear polarizations.

The birefringent elements may be formed from staged birefringent crystals (43) 1, 2, . . . , N. Crystals 43 at odd-numbered positions in the sequence may have their optic axes oriented at a 45-degree angle to a direction of linear polarization of the pulse, while crystals at the even-numbered positions may be oriented in the same direction as the linear polarization of the pulse, so that at each crystal, a pulse is split into two equal-intensity pulses, one as an ordinary (o) wave pulse and a second as an extraordinary (e) wave pulse. The o and e pulses are separated in time by $\Delta t = |1/v_e - 1/v_o|L$, where $v_o$ and $v_e$ are the group velocities of the o- and e-waves and L is the crystal length. The length of the shortest crystal in the cascade of crystals 43 may be chosen so that $\Delta t$ exceeds the pulse duration. The length of the $m^{th}$ crystal in the cascade may be $L_m = 2^{m-1}L_1$ to produce equally spaced pulses. An example of the birefringent element or crystal 43 is Yttrium vanadate.

The pulse recombiner 54 may be formed from a second sequence of birefringent elements as staged birefringent crystals 55 in an example, which also may be formed from Yttrium vanadate. Any alternating pulses with orthogonal polarizations may be separated with a polarizing beam splitter, and counter-propagate through a gain medium that requires a specific direction of linear polarization. A waveplate may exchange the direction of polarization of the counter-propagating beams, ensuring the correct polarizations for the beam entering the gain medium, and reverse the pulse replicas before the replicas are recombined into a final output pulse.

A mirror may be employed at the pulse recombiner 54 to rotate the polarization of the divided pulses by 90 degrees before pulses are fully recombined so that all pulses experience the same total delay and recombine into the output pulse. The pulse divider 42 and the pulse recombiner 54 may be implemented by a single stack of birefringent crystals 43,55. For pulse division, a pulse may be passed in a first direction through a stack of birefringent crystals 43 and for pulse recombination, a sequence of pulses may be passed in a second, opposite direction through a stack of birefringent crystals 55.

Examples of different pulse dividers 42 and pulse recombiners 54 that may be modified for use with the quantum communications system 20 of FIG. 1 are disclosed in U.S. Pat. Nos. 8,456,736; 10,109,976; and 10,374,376; and in the articles: Zhou et al., "Divided-Pulse Amplification of Ultrashort Pulses," *Optics Letters*, 32(7), 2007, pp. 871-873; Zhang et al., "Divided Pulse Soliton Self-Frequency Shift: A Multi-Color, Dual-Polarization, Power-Scalable, Broadly Tunable Optical Source," *Optics Letters*, 42(3), 2017, pp. 502-505; and Lamb et al., "Divided-Pulse Lasers," *Optics Letters*, 39(9), 2014, pp. 2775-2777, all of the disclosures which are hereby incorporated by reference in their entirety.

The use of the pulse dividers 42 and pulse recombiners 54 provides a low probability of detection where weak pulses are hid in tailored noise and makes the probability of detection low. There is a low probability of intercept because each bit, such as 100 photons to 10,000 photons for operation in the system 20 of FIG. 1, may be divided into many copies and distributing each copy into bins provides a system 20 where no useful information about the original message is gained. The system 20 may be tamper evident because attempts to measure the data mid-link may be detected by the intended recipient and it is compatible with existing methods of data encryption with added potential for protecting against the attacks.

Figure 5:
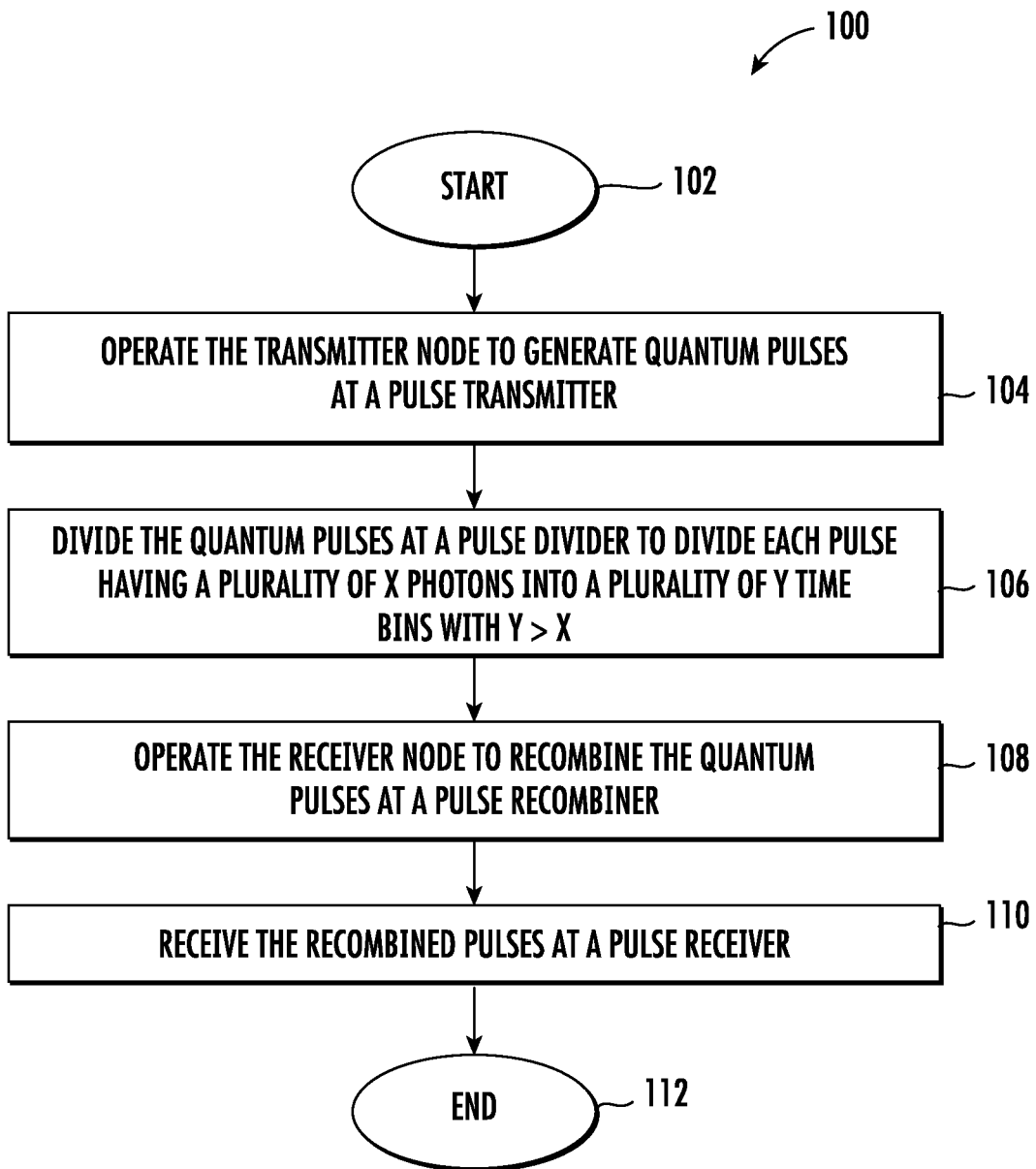
FIG. 5 is a flowchart showing a method of operating the quantum communications system of FIG. 1.

Referring now to FIG. 5, there is illustrated generally at 100 a flowchart showing a method of operating the quantum communications system 20 of FIG. 1. The process starts (Block 102) and the transmitter node is operated to generate quantum pulses at a pulse transmitter 40 (Block 104). The quantum pulses are divided at a pulse divider 42 to divide each pulse having a plurality of X photons into a plurality of Y time bins with Y greater than X (Block 106). The receiver node 28 is operated to recombine the quantum pulses at a pulse recombiner (Block 108). The recombined pulses are received at the pulse receiver 56 (Block 110). The process ends (Block 112).

Figure 6:
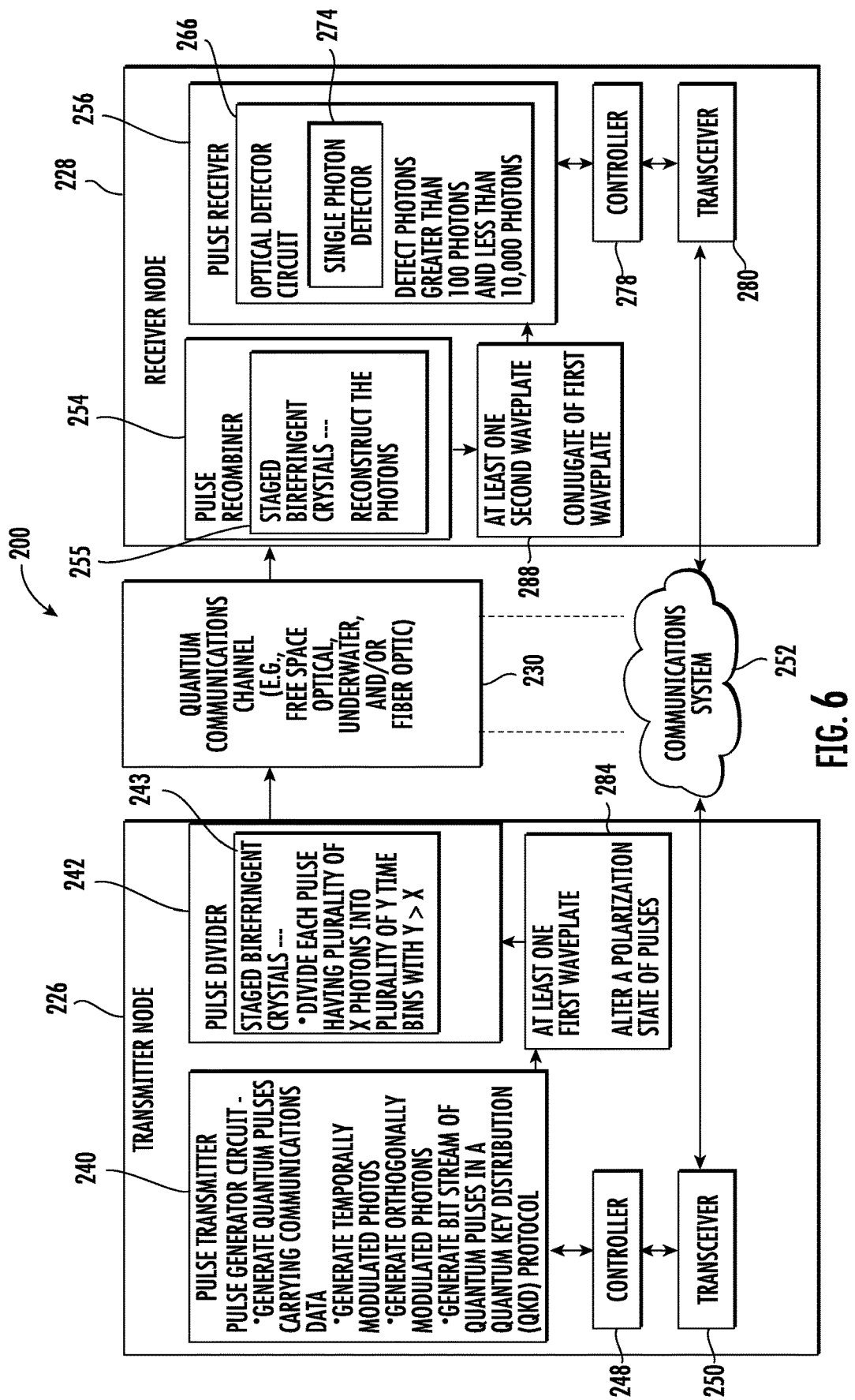
FIG. 6 is a block diagram of the quantum communications system similar to that shown in FIG. 1, but incorporating at least one waveplate to alter pulse polarization.

Referring now to FIG. 6, there is illustrated a block diagram of a quantum communications system indicated generally at 200 having at least one waveplate 284 to alter a pulse polarization. The reference numerals for components described in FIG. 6 that are common in function to the components in the quantum communications system 20 of FIG. 1 are given the same reference numerals in the block diagram of FIG. 6 except those reference numerals start in the 200 series of FIG. 6.

As illustrated, the transmitter node 226 includes the pulse transmitter 240 and pulse divider 242 downstream from the pulse transmitter and at least one first waveplate 284 upstream from the pulse divider 242 and configured to alter a polarization state of pulses traveling therethrough. The receiver node 228 also includes at least one second waveplate 288 that is a conjugate of the at least one first waveplate 284. The pulse recombiner 254 is connected upstream from the at least one second waveplate 288. The pulse receiver 256 is downstream of the pulse recombiner 254 and second waveplate 288, and may include the optical detector circuit 266 that includes at least one single photon detector 274. The optical detector circuit 266 may detect photons greater than 100 photons and less than 10,000 photons as a non-limiting example. The optical communications system 200 illustrated in FIG. 6 provides security against analog attacks for physical layer security protocols.

A conjugate receiver system is formed as integral with the receiver node 228 and provides an additional physical layer security against analog attacks via spread photon matched receivers and polarization diversity, which increases the complexity of the encoding. For example, for a 15-stage quantum communications system 200, this provides a $2^{60}$ increasing complexity in time against a brute force analog attack. This quantum communications system 200 may create phase relations to spread pulses that are matched in the conjugate receiver as a receiver node 228, making it difficult for an eavesdropper to implement both a "download today, decrypt tomorrow" type of computational attack. The matched transmitter node 226 and receiver node 228 may be reconfigurable while maintaining their scalability and their ability to provide communications at high data rates. This allows the transmitter node 226 as Alice and the receiver node 228 as Bob to share an analog key as to what polarization setting to use in the quantum communications system 200, thus updating the settings as required to maintain secure communication.

As shown in FIG. 6, the at least one first waveplate 284 is at the transmitter node 226 and at least one second waveplate 288 is at the receiver node 228. The quantum communications system 200 incorporates a conjugate receiver node 228 that provides an additional physical layer of security against analog attacks as compared to the quantum communications system 20 described in FIG. 1 using polarization diversity, which greatly increases the complexity of the encoding. For example, a 15 stage system may provide about a $2^{60}$ increase in complexity to a brute force analog attack. Phase relations may be created in the spread pulse that are matched at the receiver node 228, making it difficult for an eavesdropper to implement both a "download today, decrypt tomorrow" type of computational attack and a real time analog attack.

The matched transmitter node 226 and receiver node 228 may be reconfigurable while maintaining their scalability and ability to provide communications at high data speeds. This allows Alice as the transmitter node 226 and Bob as the receiver node 228 to share an analog key as to what polarization settings to use at their respective nodes, updating their settings as needed to maintain secure communication. The quantum communications system 200 is applicable to free space, space, underwater, and/or fiber communication links, and complements flipped-basis QKD and QSDC by providing similar performance advantages with a simpler implementation that uses linear optics, allowing for operation in free-space optical links. It may use COTS components, e.g., beam splitters, waveplates, and mirrors.

In an example, the bit stream is modulated onto the pulse transmitter 240. The output power may be modified and amplified for "classical" transmission by attenuating to X photons that permits high speed classical optical detectors to detect, but where X<Y as a classical/quantum hybrid. In some examples, it may be possible to attenuate to a single photon quantum regime. Photons are received at the matched receiver node 228 and reconstructed in reverse of the deconstruction process. A tamper evident port at the output of the matched receiver node 228 will flag corrupted photons, indicating a compromise of the link.

Figure 7:
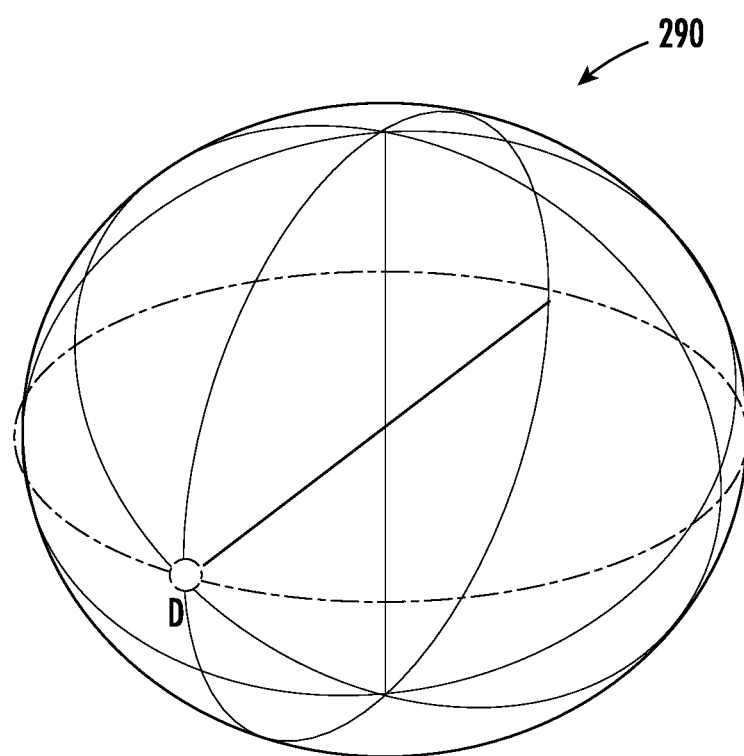
FIG. 7 is schematic diagram showing pulse polarization over a sphere that depicts polarization using waveplates in the quantum communications system of FIG. 6.

The quantum communications system 200 shown in FIG. 6 may use the spread-photon scheme and respective fixed first and second waveplates 284, 288 that can be arranged as a plurality of waveplates at respective transmitter and receiver nodes 226, 228. The waveplates 284, 288 may include a half waveplate (HWP) to operate at a fixed point at each stage, such as shown in the polarization map indicated generally at 290 in FIG. 7 and at the point labeled "D." The conjugate receiver node 228 as described allows Alice at the transmitter node 226 to set her at least first waveplates 284 such that the polarization of the pulse can be spread over the entire sphere corresponding at the polarization map as shown in FIG. 7. The quantum communications system 200 may work at the equatorial section of the polarization map 290 or "globe" that includes the point "D" to not bias the power in any stage arm. Assuming a +/−5 degree tolerance to each waveplate's settings, the system 200 may reasonably divide the circle into 36 points for 36 possible states for N stages. Compared to the quantum communications system 20 described in FIG. 1, this results in a $$\frac{36^N}{2^N} \approx 2^{4.12N}$$

increase in complexity for an adversary running a brute force analog/computational attack.

Alice at the transmitter node 226 may choose any setting for her waveplate 284, creating an arbitrary time-polarization superposition of the outgoing pulse. This can be done at every stage in the spread-photon pulse transmitter 40. Any measurement made mid-link may disturb the time-polarization superposition (detectable by Bob at his receiver node 228) and any eavesdropper that does not have the correct polarization settings key will not be able to decode the message, even if they have a receiver that is identical to Bob's receiver. At the receiver node 228, Bob sets his second waveplates 288 such that his receiver is conjugate to Alice's transmitter node 226 to decode the message.

Figure 8:
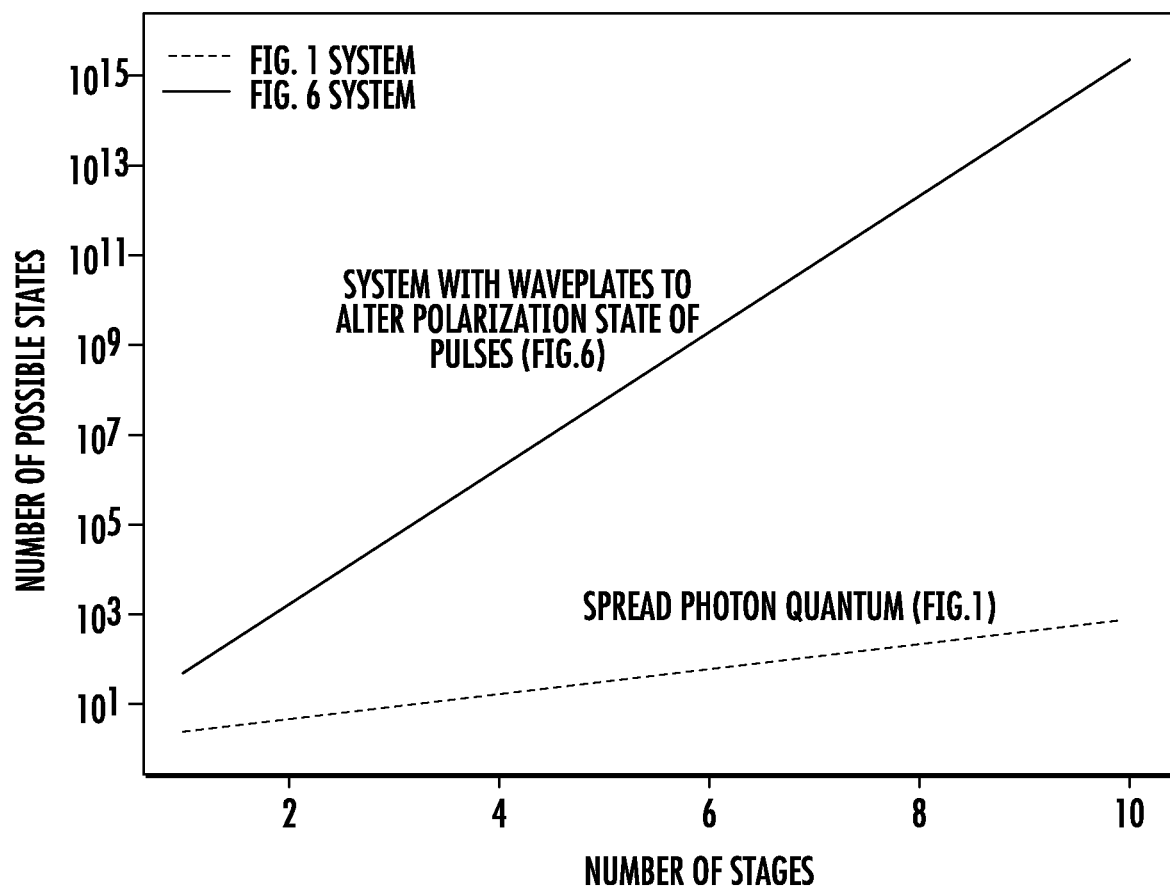
FIG. 8 is a graph comparing the number of possible states versus the number of stages for the quantum communications systems shown in FIGS. 1 and 6.

Referring to the graph of FIG. 8, the number of possible states versus the number of stages is illustrated and shows a comparison with the quantum communications system 20 of FIG. 1 and the quantum communications system 200 of FIG. 6 that incorporates the waveplates 284, 288 for altering polarization as described above. The system 200 of FIG. 6 has a greater number of possible states than the system 20 of FIG. 1.

Figure 9:
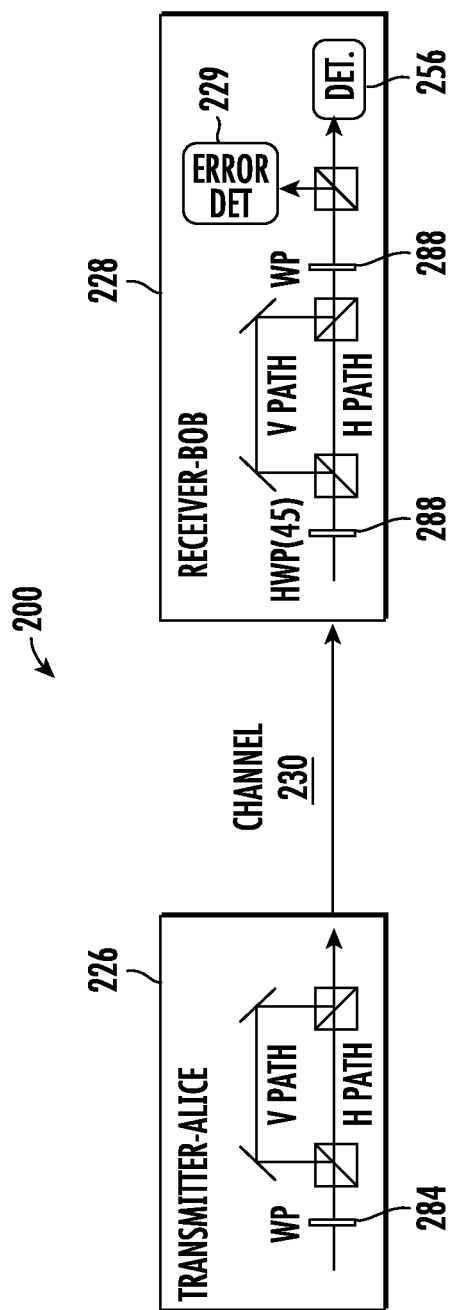
FIG. 9 is a schematic block diagram showing the optical communications system of FIG. 6 and the positioning of waveplates and error detection at the receiver node.

Referring now to FIG. 9, a schematic block diagram of the quantum communications system 200 is shown in FIG. 9 to illustrate the waveplates 284 at the transmitter node 226 corresponding to Alice and the waveplates 288 as a half-waveplate (HWP) and full waveplate (WP) and location where error detection may occur at the receiver node 228 as Bob. The transmitter node 224 shows the H path and V path and the receiver node 228 shows the H path and V path, all of which are referenced below in the description of operation. The receiver node 228 may include error detection 229 and signal detection such as at optical detector circuit 256.

It is possible to write the states in the form |P, t> where P is the polarization state and t is the time where the pulse is centered. First and second waveplate 284, 288 operators are written as $\hat{U}_{WP}$, where the waveplates operate as: $(\hat{U}_{WP} \otimes I_t)|P,t\rangle \rightarrow |P', t\rangle$. If the assumption is made that these do not change the temporal state, the operator for the unbalanced Mach-Zehnder interferometer (UMZI) with PBSs is:

$$\hat{U}_{UMZI} = |H\rangle\langle H| \otimes \hat{\beta}(t_1) + |V\rangle\langle V| \otimes \hat{\beta}(t_2).$$

The operator $\hat{\beta}(t)$ performs operation $I_{pol} \otimes \hat{\beta}(t)|P,t_0\rangle \rightarrow |P, t_0+t\rangle$. There are assumptions and conventions:

|P, t> is shorthand for $|P\rangle \otimes |t\rangle = |P\rangle|t\rangle$.

$I_s$ is the identity matrix for the D.O.F.

Define $\hat{\beta}(t_1)\hat{\beta}(t_2) = \hat{\beta}(t_1+t_2)$.

Using standard Jones matrix formalism:

$$|H\rangle = \begin{pmatrix} 1 \\ 0 \end{pmatrix}, \quad |V\rangle = \begin{pmatrix} 0 \\ 1 \end{pmatrix}.$$

It is necessary to model the channels correctly in order to accurately simulate system dynamics. The final state may be written as:

$$|\psi_f\rangle = \hat{U}_{receiver}\hat{U}_{channel}\hat{U}_{transmitter}|\psi_i\rangle.$$

It is possible to assume that the input state can be written as:

$$|\psi_i\rangle = |H, t=0\rangle.$$

It is possible to assume that the channel is not birefringent: each polarization obtains a constant phase shift/loss. It is possible to effectively ignore the channel effects in calculating the optimal receiver node 228. To keep formalism compact, it is possible to suppress identity matrix so that $(\hat{U}_{WP} \otimes I_t) = \hat{U}_{WP}$ with the understanding that the waveplates 284, 288 do not affect time.

It is possible to look at the evolution of a state through a single filter stage. It is possible to assume that the initial state is |H,t=0>, so the state out of the filter is:

$$|\psi_{out}\rangle = \hat{U}_{UMZI}\hat{U}_{WP,TX}|H, t=0\rangle = \hat{U}_{transmitter}|\psi_i\rangle.$$

The state at the receiver node 228 from a single stage transmitter node 226 is:

$$|\psi_{out}\rangle = \hat{U}_{TX}|\psi_i\rangle = \hat{U}_{UMZI}\hat{U}_{WP,TX}|H, t=0\rangle = [|H\rangle\langle H|\hat{U}_{WP,TX} \otimes \hat{\beta}(t_s) + |V\rangle$$

$$\langle V|\hat{U}_{WP,TX} \otimes \hat{\beta}(t_l)]|H, t=0\rangle|\psi_{out}\rangle =$$

$$\langle H|\hat{U}_{WP,TX}|H\rangle|H, t_s\rangle + \langle V|\hat{U}_{WP,TX}|H\rangle|V, t_l\rangle.$$

It is possible to ignore loss where there are unitary operators, so ideally:

$$\hat{U}_{ideal,RX} = \hat{U}_{TX}^+ = U_{WP}^+|H\rangle\langle H|\otimes\hat{\beta}(-t_s) + \hat{U}_{WP}^+|V\rangle\langle V|\otimes\hat{\beta}(-t_l).$$

However, this would need the operator $\hat{\beta}(-t)$, which the quantum communications system 200 cannot do physically. For that reason, the quantum communications system 200 may use the same UMZI as the transmitter node 226 with a bit flip so that each polarization receives that same time shift, effectively negating the UMZI:

$$U_{RX} = U_{WP,TX}^+|H\rangle\langle H|\otimes\hat{\beta}(t_l) + \hat{U}_{WP,TX}^+|V\rangle\langle V|\otimes\hat{\beta}(t_s).$$

Using the receiver node 228 as shown as in the schematic of the quantum communications system 200 diagram in FIG. 9, the effect of the UMZI is:

$$\hat{U}_{Actual,RX} = \hat{U}_{WP,RX}|V\rangle\langle H|\otimes\hat{\beta}(t_l) + \hat{U}_{WP,RX}|H\rangle\langle V|\otimes\hat{\beta}(t_s).$$

The quantum communications system 200 may recover the effective ideal receiver node 228 by allowing $\hat{U}_{WP,RX} = \hat{U}_{WP,TX}^+\hat{U}_{HWP}(45°)$, and as a result:

$$U_{WP,TX}^+\hat{U}_{HWP}(45°)|V\rangle\langle H|\otimes\hat{\beta}(t_l) + \hat{U}_{WP,TX}^+\hat{U}_{HWP}(45°)|H\rangle\langle V|\otimes\hat{\beta}(t_s) = \hat{U}_{WP,TX}^+|H\rangle\langle H|\otimes\hat{\beta}(t_l) + \hat{U}_{WP,TX}^+|V\rangle\langle V|\otimes\hat{\beta}(t_s).$$

For a concrete example, the second waveplate 288 may be a HWP that could be either set to +/−2.25 degrees such as:

$$\hat{U}_{WP} = \hat{U}_{HWP}(\pm 22.5°) = \frac{1}{\sqrt{2}}\begin{pmatrix} 1 & \pm 1 \\ \pm 1 & -1 \end{pmatrix}$$

and $$|\psi_{out}\rangle = \frac{1}{\sqrt{2}}[\,|H,t_s\rangle \pm |V,t_l\rangle\,].$$

The paths may be labeled with s and l for long and short. The polarization and temporal degrees of freedom are now entangled. To make a match for this filter, it is possible to pass the state through a half-waveplate set to 45 degrees to flip H and V:

$$\rightarrow |\psi_{out}\rangle = \frac{1}{\sqrt{2}}[\,|V,t_s\rangle \pm |H,t_l\rangle\,].$$

Passing this through an identical UMZI gives:

$$|\psi_{out}\rangle = \frac{1}{\sqrt{2}}[\,|V,t_s+t_l\rangle \pm |H,t_l+t_s\rangle\,] = \frac{1}{\sqrt{2}}[\,|V\rangle \pm |H\rangle]|t_s+t_l\rangle.$$

It is possible to use the previous results to calculate $\hat{U}_{WP,RX} = \hat{U}_{HWP}^+(\pm 22.5°)\hat{U}_{HWP}(45°)$, and $\rightarrow|\psi_f\rangle = |H\rangle|t_s+t_l\rangle$, and thus assumes no error.

Alice as the transmitter node 226 and Bob as the receiver node 228 may each have their own waveplate 284,288 operators given by $\hat{U}_{wp,A}$, $\hat{U}_{wp,B}$. The state received (just before Bob's final PSB, and ignoring the channel) is:

$$\hat{U}_{WP,B}\hat{U}_{UMZI,B}\hat{U}_{HWP}(45°)\hat{U}_{UMZI,A}\hat{U}_{WP,A}|H,0\rangle.$$

If Bob's receiver node 228 balances the interferometer such that $\hat{U}_{UMZI,B} = \hat{U}_{UMZI,A}$, then the following applies:

$$[\hat{U}_{WP,B}|H\rangle\langle V|\hat{U}_{WP,A} + \hat{U}_{WP,B}|V\rangle\langle H|\hat{U}_{WP,A}]|H,t_s+t_l\rangle.$$

It is possible to set $\hat{U}_{WP,B} = \hat{U}_{WP,A}^+\hat{U}_{HWP}(45°)$. There are no restrictions on what the second waveplate 288 can be. Bob at his receiver node 228 can always undo it.

When there are N states at the transmitter node 226 and the receiver node 228, and arbitrary waveplates 284, 288, the receiver state is:

$$\hat{U}_{1,RX}\ldots\hat{U}_{N,RX}\hat{U}_{HWP}(45°)\hat{U}_{N,TX}\ldots\hat{U}_{1,TX}|H,0\rangle.$$

The "N-th" (first stage of the receiver node 228) is:

$$\hat{U}_{N,RX}\hat{U}_{HWP}(45°)\hat{U}_{N,TX} = (\hat{U}_{WP,N,RX}|H\rangle\langle V|\otimes\hat{\beta}(t_{s,N}) + \hat{U}_{WP,N,RX}|V\rangle\langle H|\otimes\hat{\beta}(t_{l,N}))(|H\rangle\langle H|\hat{U}_{WP,N,TX} \text{ and } \otimes\hat{\beta}(t_{s,N}) + |V\rangle\langle V|\hat{U}_{WP,N,RX}\otimes\hat{\beta}(t_{l,N})) = (\hat{U}_{WP,N,RX}|H\rangle\langle V|\hat{U}_{WP,N,TX} + \hat{U}_{WP,N,RX}|V\rangle\langle H|\hat{U}_{WP,N,TX})\otimes\hat{\beta}(t_{s,N}+t_{l,N}).$$

It is possible to let $\hat{U}_{WP,N,RX} = \hat{U}_{HWP}(45°)\hat{U}_{WP,N,TX}^+\hat{U}_{HWP}(45°)$. The first two terms may remove the effect of the Nth scrambling stage. The third term reflips the polarization for the next unscrambling stage. This process continues but with $\hat{U}_{WP,1,RX} = \hat{U}_{WP,1,TX}^+\hat{U}_{HWP}(45°)$. Alice as the transmitter node 226 may choose each of the waveplates 284 to be anything, but Bob as the receiver node 228 must know what each one is. There are many possibilities, which may require secure communications or prior knowledge.

Referring again to the graph of FIG. 8, the quantum communications system 200 shown in FIG. 6 that uses the first waveplate 284 to alter the polarization state of the pulses is compared to the quantum communications system 20 shown in FIG. 1, which does not incorporate the waveplates but still spreads the photons such that its pulse divider 42 divides each pulse having a plurality of X photons into a plurality of Y time bins with Y>X. This graph illustrates the advantage where the number of possible states is compared with the number of stages, showing at about 10 stages. The quantum communications system 20 of FIG. 1 has about $10^3$ possible states, while the quantum communications system shown in FIG. 6 that uses the waveplates 284,288 has about $10^{15}$ possible states.

Figure 10:
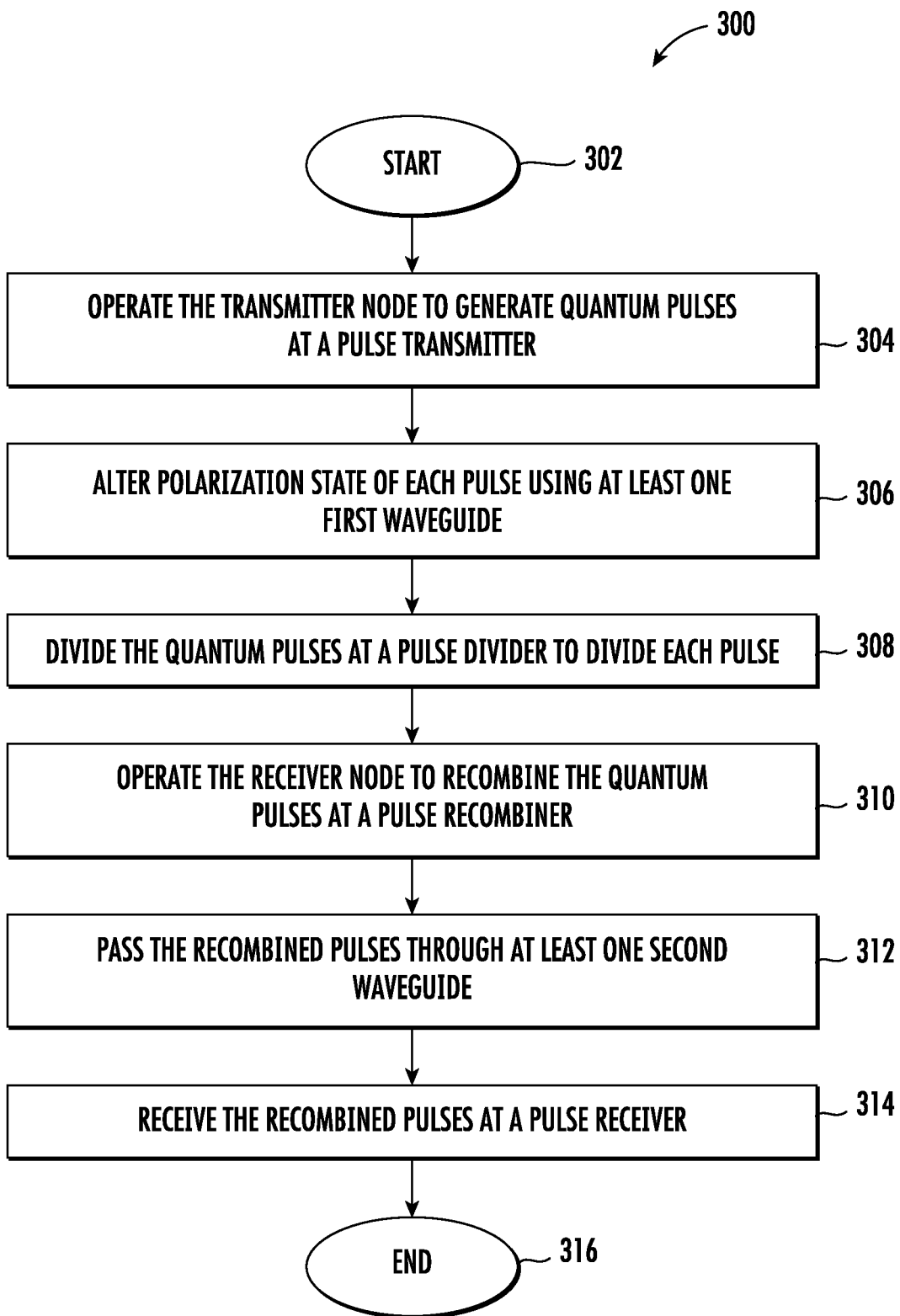
FIG. 10 is a flowchart showing a method of operating the quantum communications system of FIG. 6.

Referring now to FIG. 10, there shown a flowchart illustrated generally at 300 for a method of operating the quantum communications system 200 of FIG. 6. The process starts (Block 302) and the transmitter node 226 is operated to generate quantum pulses in the pulse transmitter 240 (Block 304). The polarization state of each pulse is altered using at least one first waveplate (Block 306). The quantum pulses are divided at the pulse divider 242 to divide each pulse (Block 308). The receiver node 228 is operated to recombine the quantum pulses at the pulse recombiner 254 (Block 310). The pulses are passed through at least one second waveplate 288 (Block 312). The recombined pulses are received at a pulse receiver 256 (Block 314). The process ends (Block 316).

This application is related to copending patent applications entitled, "QUANTUM COMMUNICATIONS SYSTEM HAVING AT LEAST ONE WAVEPLATE TO ALTER PULSE POLARIZATION AND ASSOCIATED METHODS," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A quantum communications system comprising:
a transmitter node, a receiver node, and a quantum communications channel coupling the transmitter node and receiver node;
the transmitter node comprising a pulse transmitter and a pulse divider downstream therefrom, the pulse divider configured to divide each pulse having a plurality of X photons into a plurality of Y time bins with Y>X, wherein the pulse divider comprises a plurality of staged birefringent crystals; and
the receiver node comprising a pulse recombiner and a pulse receiver downstream from the pulse recombiner.

2. The quantum communications system of claim 1 wherein the pulse receiver comprises a detector configured to detect a number of photons greater than 100 photons.

3. The quantum communications system of claim 1 wherein the pulse receiver comprises a detector configured to detect a number of photons less than 10,000 photons.

4. The quantum communications system of claim 1 wherein the pulse recombiner comprises a plurality of staged birefringent crystals.

5. The quantum communications system of claim 1 wherein the pulse transmitter is configured to generate temporally modulated photons.

6. The quantum communications system of claim 1 wherein the quantum communications channel comprises at least one of a fiber optic communications channel, a free space optic communications channel, and an underwater optic communications channel.

7. The quantum communications system of claim 1 wherein the pulse transmitter is configured to generate orthogonally modulated photons.

8. The quantum communications system of claim 1 wherein the pulse transmitter is configured to generate a bit stream of quantum pulses in a quantum key distribution (QKD) protocol.

9. A quantum communications system comprising:
a communications system; and
a quantum key distribution (QKD) system operable with the communications system and comprising
a transmitter node, a receiver node, and a quantum communications channel coupling the transmitter node and receiver node,
the transmitter node comprising a pulse transmitter and a pulse divider downstream therefrom, the pulse divider configured to divide each pulse having a plurality of X photons into a plurality of Y time bins with Y>X, and
the receiver node comprising a pulse recombiner and a pulse receiver downstream therefrom, wherein the pulse divider comprises a first plurality of staged birefringent crystals; and wherein the pulse recombiner comprises a second plurality of staged birefringent crystals.

10. The quantum communications system of claim 9 wherein the pulse receiver comprises a detector configured to detect a number of photons greater than 100 photons.

11. The quantum communications system of claim 9 wherein the pulse receiver comprises a detector configured to detect a number of photons less than 10,000 photons.

12. The quantum communications system of claim 9 wherein the pulse transmitter is configured to generate temporally modulated photons.

13. The quantum communications system of claim 9 wherein the quantum communications channel comprises at least one of a fiber optic communications channel, a free space optic communications channel, and an underwater optic communications channel.

14. The quantum communications system of claim 9 wherein the pulse transmitter is configured to generate orthogonally modulated photons.

15. The quantum communications system of claim 9 wherein the pulse transmitter is configured to generate a bit stream of quantum pulses in a quantum key distribution (QKD) protocol.

16. A method of operating a quantum communications system comprising a transmitter node, a receiver node, and a quantum communications channel coupling the transmitter node and receiver node, the method comprising:
operating the transmitter node to generate quantum pulses at a pulse transmitter and dividing the quantum pulses at a pulse divider to divide each pulse having a plurality of X photons into a plurality of Y time bins with Y>X; and
operating the receiver node to recombine the divided quantum pulses at a pulse recombiner, and receiving the recombined pulses at a pulse receiver, wherein the pulse divider comprises a first plurality of staged birefringent crystals, and wherein the pulse recombiner comprises a second plurality of staged birefringent crystals.

17. The method of claim 16 wherein the pulse receiver comprises a detector configured to detect a number of photons greater than 100 photons.

18. The method of claim 16 wherein the pulse receiver comprises a detector configured to detect a number of photons less than 10,000 photons.

19. The method of claim 16 wherein the quantum communications channel comprises at least one of a fiber optic communications channel, a free space optic communications channel, and an underwater optic communications channel.

20. The method of claim 16 wherein the pulse transmitter is configured to generate orthogonally modulated photons.

21. The method of claim 16 wherein the pulse transmitter is configured to generate a bit stream of quantum pulses in a quantum key distribution (QKD) protocol.

* * * * *